Figure 1:
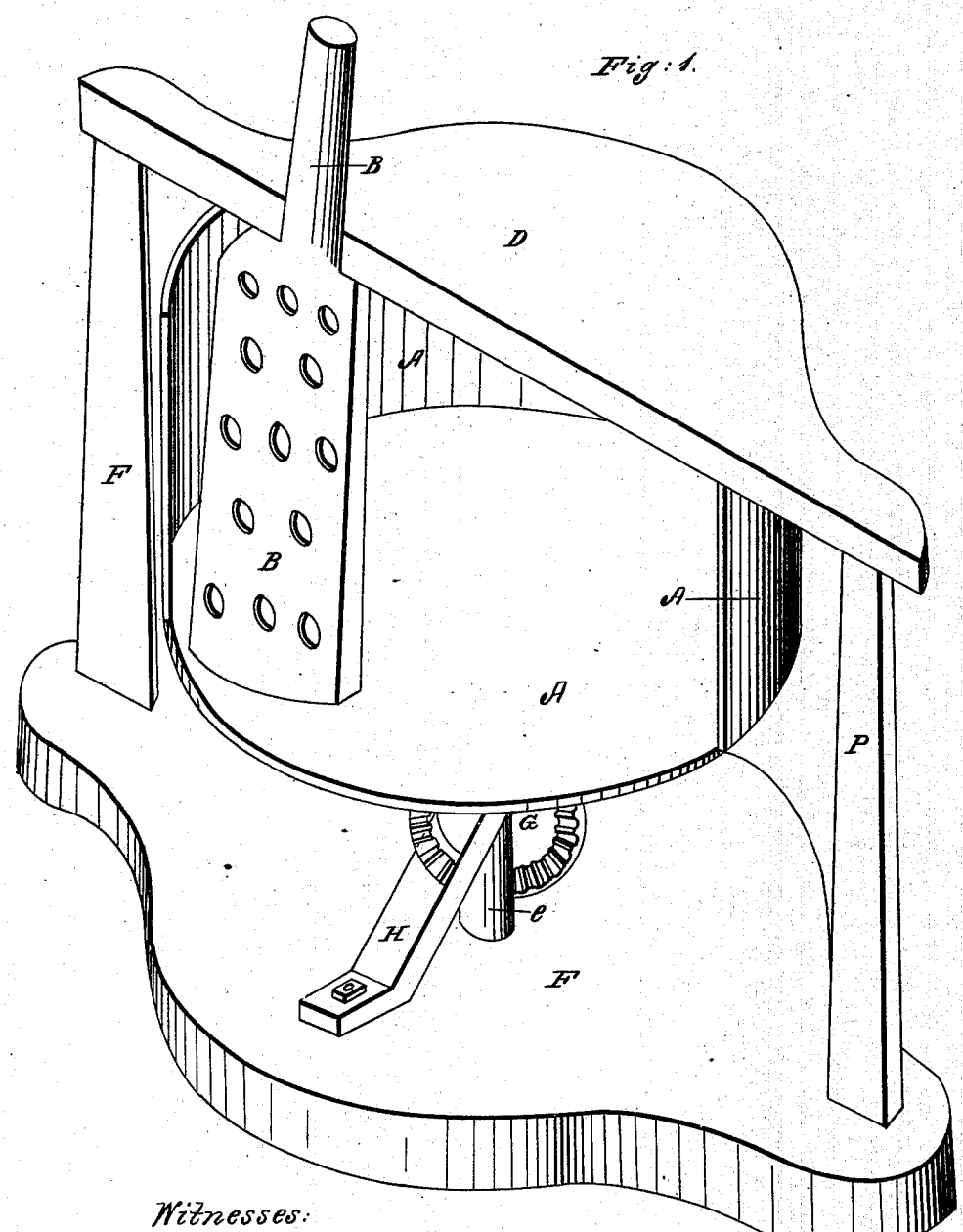

M. S. HARSHA.
Churn.

No. 26,459.

Patented Dec. 13, 1859.

Witnesses:
J. B. French Jr.
H. B. Dickinson

Inventor:
M. S. Harsha

UNITED STATES PATENT OFFICE.

MORTIMER S. HARSHA, OF SYCAMORE, ILLINOIS, ASSIGNOR TO HIMSELF, RUFUS S. SANBORN, AND H. B. JONES, OF SAME PLACE.

CHURN.

Specification of Letters Patent No. 26,459, dated December 13, 1859.

*To all whom it may concern:*

Be it known that I, MORTIMER S. HARSHA, of Sycamore, county of Dekalb, and State of Illinois, have invented a new and useful Machine called "Vertical Rotating and Stationary Break Churn" for the Purpose of Churning Cream or Milk; and I hereby declare that the following is a full, exact, and clear description thereof, reference being had to the accompanying drawings and the letters marked thereon, and in which—

A, A, A, A, is a perspective view of side and bottom of a cream receiver resting on a vertical or upright shaft. C, is said shaft resting or turning in a socket at its lower end.

H is brace to vertical shaft forming also its journal box.

G is gear wheel at right angle with a pinion on said shaft, and by which it is revolved.

E is bottom of the machine, on which rests the bearing of gearing, brace, shaft, and supports for top or cover.

F, F, are supports to said top, or cover. B, B, is stationary break dash made fast to said top near the inner side of said cream receiver, and running downward nearly to its bottom.

The nature of my invention consists in providing a small and entirely stationary break dash, so arranged and combined with a cream receiver made to rotate on a vertical or upright shaft, having a point bearing at the bottom, that by this means and arrangement there is a very great economizing or saving of power necessary to be applied in other and ordinary modes of churning. This is accomplished by said break presenting only a small resisting surface to the moving cream, while the cream being made to rapidly rotate on said vertical or upright shaft only against said break dash, becomes, along with its receiver, a receptacle of the power applied, similar to that of a balance wheel, and so by its own accumulative force, when power is once applied, puts it in motion, assists in operating either a small or large machine, insuring, at the same time, a rapid and even agitation of the liquid mass, mixing air with the same to produce the intended result.

To enable others skilled in the art to make and use my invention, I will proceed to describe its construction and operation.

I construct my cream receiver of tin, zinc, wood or any other material in common use, in the form of a short cylinder or tube, and support the same on a vertical or upright shaft by means of a flange. I construct the shaft aforesaid of iron or steel having it rest or turn in a socket at its lower end, and made at said end small, as to a point, to lessen friction. I support said shaft by a brace covering up two thirds or more of its height which also forms a journal box for said shaft. I rotate the vertical shaft and cream receiver by means of a gear wheel at right angle with a pinion, which I place on said shaft just below the flange for receiver. I apply a short crank to shaft of gear wheel, and operate the same by hand, or other means in common use. I place supports running up from the bottom to the top of said machine, which top or cover I affix to supports by means of a mortise and tenon, so as to be easily removed, for the purpose of filling, emptying, or cleaning the receiver. I attach a narrow stationary break dash to said top or cover by means of a mortise and tenon, or by screw and nut, so that it runs downward near the side of the cream receiver, on its inner surface, nearly to its bottom. This break I construct of wood or other material in common use, making it of such size as the relative size of the machine requires, and of any common form or shape.

What I claim as my invention, and desire to secure by Letters Patent, is—

An entirely stationary break dash in combination with a cream receiver, made to rotate on a vertical or upright shaft, as above described, and for the purposes set forth.

MORTIMER S. HARSHA.

Witnesses:
J. B. FRENCH, Jr.,
H. B. DICKINSON.